United States Patent
Kojima et al.

(10) Patent No.: US 11,701,955 B2
(45) Date of Patent: Jul. 18, 2023

(54) AUTOMOTIVE DOOR GLASS RUN

(71) Applicant: Nishikawa Rubber Co., Ltd., Hiroshima (JP)

(72) Inventors: Masahiro Kojima, Hiroshima (JP); Yasuhiro Morihara, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 192 days.

(21) Appl. No.: 17/360,223

(22) Filed: Jun. 28, 2021

(65) Prior Publication Data
US 2022/0001733 A1     Jan. 6, 2022

(30) Foreign Application Priority Data
Jul. 2, 2020   (JP) .................. 2020-114806

(51) Int. Cl.
*B60J 10/74*     (2016.01)
*B60J 10/88*     (2016.01)
*B60J 10/76*     (2016.01)

(52) U.S. Cl.
CPC .............. *B60J 10/74* (2016.02); *B60J 10/76* (2016.02); *B60J 10/88* (2016.02)

(58) Field of Classification Search
CPC ... B60J 10/18; B60J 10/88; B60J 10/76; B60J 5/0402; B60R 13/0243
USPC ................................................. 296/146.02
See application file for complete search history.

(56) References Cited

U.S. PATENT DOCUMENTS

| | | | |
|---|---|---|---|
| 4,838,004 A * | 6/1989 | Adell .................... | E04F 19/026 |
| | | | 52/716.6 |
| 9,091,114 B2 * | 7/2015 | Franzen ................ | B60J 10/265 |
| 9,114,765 B1 | 8/2015 | James et al. | |
| 9,434,324 B2 * | 9/2016 | Goto ...................... | B32B 3/266 |
| 9,802,555 B2 * | 10/2017 | Thiel ...................... | B60J 10/30 |
| 2015/0165880 A1 * | 6/2015 | Mass ..................... | B60J 5/0402 |
| | | | 49/490.1 |
| 2018/0186225 A1 * | 7/2018 | Charge .................... | B60J 10/79 |
| 2018/0290526 A1 * | 10/2018 | Nishikawa ............. | B60R 13/06 |
| 2018/0313139 A1 * | 11/2018 | Nishikawa .............. | B60J 10/79 |

FOREIGN PATENT DOCUMENTS

WO   WO-2018042394 A1 *   3/2018   ............ B60J 10/265

* cited by examiner

*Primary Examiner* — Jason S Morrow
*Assistant Examiner* — Sara Laghlam
(74) *Attorney, Agent, or Firm* — Renner, Otto, Boisselle & Sklar, LLP (57) ABSTRACT

A glass run includes a trim strip 40 attached to a side of an upper glass run 24 facing outside of the passenger compartment. A trim strip holding member 50 having a front engagement portion 52 that engages with the trim strip 40 is fixed at a front side of the upper glass run 24. The trim strip holding member 50 is made of a rigid material.

7 Claims, 8 Drawing Sheets

AUTOMOTIVE DOOR GLASS RUN

CROSS-REFERENCE TO RELATED APPLICATION

This application claims priority to Japanese Patent Application No. 2020-114806 filed on Jul. 2, 2020, the entire disclosure of which is incorporated by reference herein.

BACKGROUND

The present disclosure relates an automotive door glass run to be attached to a door provided for an automobile. In particular, the present disclosure belongs to a technical field of a structure of the glass run having a trim strip to be attached to a side facing the outside of the passenger compartment.

There are, as doors on both sides of an automobile, doors with a window frame holding a peripheral edge of a window glass. A door having such a window frame is provided with a glass run for sealing a gap between the window frame and the window glass.

The glass runs disclosed in U.S. Patent Application Publication No. 2015/0165880 and U.S. Pat. No. 9,114,765 are attached to the window frame from outside of the passenger compartment. The glass run attached to a window frame from the outside of the passenger compartment as in U.S. Patent Application Publication No. 2015/0165880 may be employed under design requirements of the vehicle, for example.

In U.S. Patent Application Publication No. 2015/0165880 and U.S. Pat. No. 9,114,765, a trim strip elongated in the front-rear direction of the vehicle is attached to the side of the glass run facing the outside of the passenger compartment. Upper and lower ends of the trim strip engage with upper and lower engagement portions provided in the glass run body, respectively.

SUMMARY

A glass run generally includes a front glass run and a rear glass run extending vertically along a front edge and a rear edge of the window glass, respectively, and an upper glass run extending from an upper end of the front glass run to an upper end of the rear glass run in a front-rear direction. In this case, the trim strip is attached to a side of the upper glass run facing the outside of the passenger compartment.

Incidentally, sometimes a front sealing portion extending vertically along a front portion of the door is provided in front of the front glass run. In this case, the upper glass run may be extended forward so that the front sealing portion and the upper glass run are integral with each other. If this structure is employed, the trim strip needs to be extended forward along the upper glass run by the length of the upper glass run extended forward.

In assembling a glass run having this trim strip to a window frame, the front sealing portion is, in some cases, bent from a vicinity of its base so as to elastically deform the front sealing portion along the front edge of the door. Further, the front sealing portion may sometimes be bent from a vicinity of its base during transportation of the glass run having the trim strip. When the front sealing portion bends, its bending force reaches also the upper glass run, thereby causing the upper glass run to elastically deform. As a result, an upper engagement portion or a lower engagement portion formed at the upper glass run becomes separated from the trim strip, which is the cause of defects such as deterioration of the exterior appearance. If the trim strip comes off, the trim strip needs to be reattached, which is effort-consuming.

The present disclosure has been made in view of the above problems, and its objective is to reduce the occurrence of defects such as separation of the trim strip from the upper glass run even when a bending force is applied to the front sealing portion attached to the front portion of the door.

In order to achieve the objective, a first aspect of the present disclosure is directed to an automotive door glass run configured to be attached, from outside of a passenger compartment of a vehicle, to a glass run attachment plate which is included in an upper frame of a window frame and which extends toward the outside of the passenger compartment, to seal a gap between the window frame and a window glass, the window frame extending so as to define a window opening of an automotive door, the automotive door glass run including: a front glass run extending vertically along a front-side frame of the window frame; a rear glass run extending vertically along a rear-side frame of the window frame; a front sealing portion disposed so as to be separated from and closer to a front of the vehicle than the front glass run, the front sealing portion being configured to be attached to a vehicle front portion of the door; an upper glass run extending from an upper end of the front sealing portion, through an upper end of the front glass run, to reach an upper end of the rear glass run, the upper glass run including an upper-side upper engagement portion and a lower-side upper engagement portion at upper and lower portions of a side of the upper glass run facing the outside of the passenger compartment, respectively; a trim strip extending in a vehicle front-rear direction along the side of the upper glass run facing the outside of the passenger compartment, the trim strip being configured to be attached to the upper glass run by being engaged with the upper-side upper engagement portion and the lower-side upper engagement portion; and a trim strip holding member made of a rigid material harder than a portion of the upper glass run at which the upper glass run comes into contact with the window glass, the trim strip holding member being fixed to the upper glass run at a position closer to a front side of the vehicle than the front glass run, the trim strip holding member having a front engagement portion protruding further to the outside of the passenger compartment than a surface of the upper glass run facing the outside of the passenger compartment and configured to engage with the trim strip.

According to this configuration, the trim strip may be attached to the upper glass run by being engaged with the upper-side upper engagement portion and the lower-side upper engagement portion of the upper glass run. In this state, the trim strip is engaged with the front engagement portion of the trim strip holding member as well. Since the trim strip holding member is positioned closer to the front side of the vehicle than the front glass run, the trim strip holding member engages with a portion of the trim strip closer to the front sealing portion. Moreover, since the trim strip holding member is made of a rigid material, the front engagement portion is less likely to deform, and once engaged, the front engagement portion is less likely to be separated from the trim strip. Thus, even if the front sealing portion is greatly bent and the upper glass run slightly elastically deforms in, for example, attaching the glass run to the window frame or during transportation of the glass run, detachment of the trim strip from the upper glass run may be avoided.

According to a second aspect of the present disclosure, the trim strip holding member includes an embedded planar portion embedded in the upper glass run.

According to this configuration, the trim strip holding member may be tightly fixed to the upper glass run by the embedded planar portion embedded in the upper glass run. The embedded planar portion may be embedded in the upper glass run through insert-molding of the trim strip holding member, or the embedded planar portion may be embedded by a two-color molding method. If the two-color molding method is used, the rubber material forming the upper glass run may be injection-molded after injection molding of the resin material forming the trim strip holding member.

According to a third aspect of the present disclosure, the upper glass run includes a core made of a rigid material harder than the portion at which the upper glass run comes into contact with the window glass, and the embedded planar portion is disposed below the core and extends along the core in the vehicle front-rear direction.

According to this configuration, the core reduces the deformation or displacement of the embedded planar portion when, for example, a force in a direction that separates the trim strip acts on the front engagement portion of the trim strip holding member due to bending of the front sealing portion. Thus, the risk of the trim strip separating from the front engagement portion is further reduced.

According to a fourth aspect of the present disclosure, each of the upper-side upper engagement portion and the lower-side upper engagement portion is configured as an elongated protrusion that protrudes from the surface of the upper glass run facing the outside of the passenger compartment toward the outside of the passenger compartment and extending in the vehicle front-rear direction, and the front engagement portion of the trim strip holding member is disposed closer to the front of the vehicle than the lower-side upper engagement portion and positioned on an extension line of the lower-side upper engagement portion extending toward the front side of the vehicle.

According to this configuration, the front engagement portion of the trim strip holding member is positioned on the extension line of the lower-side upper engagement portion of the upper glass run, which allows the engagement portion of the trim strip to have a uniform cross-sectional shape in the longitudinal direction, making it easy to manufacture the trim strip. At the same time, this configuration allows the trim strip to be engaged with, and tightly fixed to, both the lower-side upper engagement portion of the upper glass run and the front engagement portion of the trim strip holding member.

According to a fifth aspect of the present disclosure, the upper glass run includes a protrusion protruding toward the outside of the passenger compartment at a position closer to the front side of the vehicle than the front glass run, the trim strip includes a front contact portion at a position closer to the front side of the vehicle, the front contact portion being positioned so as to be capable of abutting on the protrusion from the front side of the vehicle, and the trim strip holding member includes a positioning portion embedded in the protrusion.

That is, when the door is opened and closed many times or closed strongly, the trim strip may be displaced toward the rear of the vehicle since the trim strip is a member independent of the upper glass run. When displaced rearward, the trim strip may interfere with other components provided on the rear side of the door, which may cause the deterioration of the exterior appearance.

According to this configuration, the front contact portion of the trim strip is positioned so as to be capable of abutting on the protrusion of the upper glass run from the front side of the vehicle while the trim strip is attached to the upper glass run. Further, the positioning portion made of the rigid material is embedded in this protrusion. The deformation of the protrusion is therefore reduced by the positioning portion. Thus, when the trim strip is caused to displace rearward and the front contact portion comes into contact with the protrusion of the upper glass run, the rearward displacement of the trim strip is sufficiently reduced by the protrusion and the positioning portion. As a result, the trim strip does not interfere with other components, and a good exterior appearance can be maintained.

According to the sixth aspect of the present disclosure, the positioning portion of the trim strip holding member protrudes toward the outside of the passenger compartment.

According to this configuration, a long dimension of the positioning portion in the vehicle width direction may be secured. Thus, even if the front contact portion of the trim strip is slightly displaced in the vehicle width direction, the displacement of the trim strip toward the rear of the vehicle may be reduced.

According to the seventh aspect of the present disclosure, the positioning portion of the trim strip holding member includes a filled portion that is filled with a material forming the upper glass run from a side of the positioning portion closer to the passenger compartment.

According to this configuration, since the material forming the upper glass run fills the positioning portion of the trim strip holding member, the positioning portion is tightly fixed to the upper glass run edge. As a result, the positioning portion may further reduce the displacement of the trim strip toward the rear of the vehicle.

As described above, according to the present disclosure, the trim strip holding member made of a rigid material is fixed to a portion of the upper glass run closer to the front of the vehicle, and the trim strip holding member includes the front engagement portion that protrudes toward the outside of the passenger compartment and engages with the trim strip. Thus, even if a bending force is applied to the front sealing portion attached to the front portion of the door, the trim strip is kept from detaching from the upper glass run, which enables to reduce the occurrence of defects.

DETAILED DESCRIPTION

An embodiment of the present disclosure will now be described in detail with reference to the drawings. The following description of an advantageous embodiment is only an example in nature, and is not intended to limit the scope, applications or use of the present disclosure.

Figure 1:
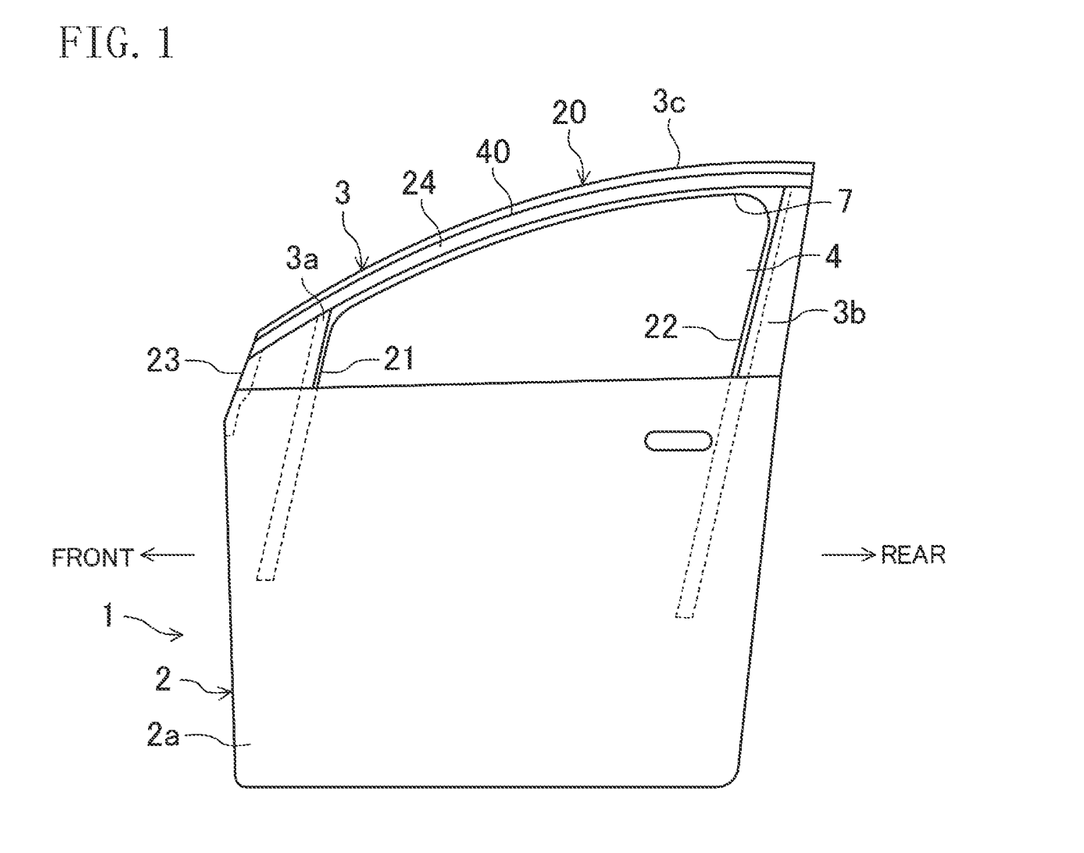
FIG. 1 is a diagram illustrating a front door of an automobile including an automotive door glass run according to an embodiment of the present disclosure, as viewed from outside of a passenger compartment.

FIG. 1 is a diagram illustrating an automotive door 1 equipped with an automotive door glass run 20 according to the embodiment of the present disclosure, as viewed from outside of a passenger compartment. This automotive door 1 is a front door to be provided at the front on each side of an automobile (not shown). The automotive door 1 uncovers and covers an opening (not shown) at the front on the side of the automobile. Although not shown, a rear door may be arranged on each side of the automobile. In the description of this embodiment, the side closer to the front of the vehicle is simply referred to as "front," and the side closer to the rear of the vehicle is simply referred to as "rear."

The automotive door 1 includes a door body 2 constituting substantially the lower half of the automotive door 1, and a window frame 3 constituting substantially the upper half. Although not shown, a front end of the door body 2 is attached to a pillar of the automobile body via hinges pivoting about an axis extending in a vertical direction. The door body 2 includes an inner panel (not shown) and an outer panel 2a that are steel plates, for example. The door body 2 may house window glass 4 that is lifted or lowered, and a window regulator (not shown) for lifting or lowering the window glass 4, for example.

Figure 5:
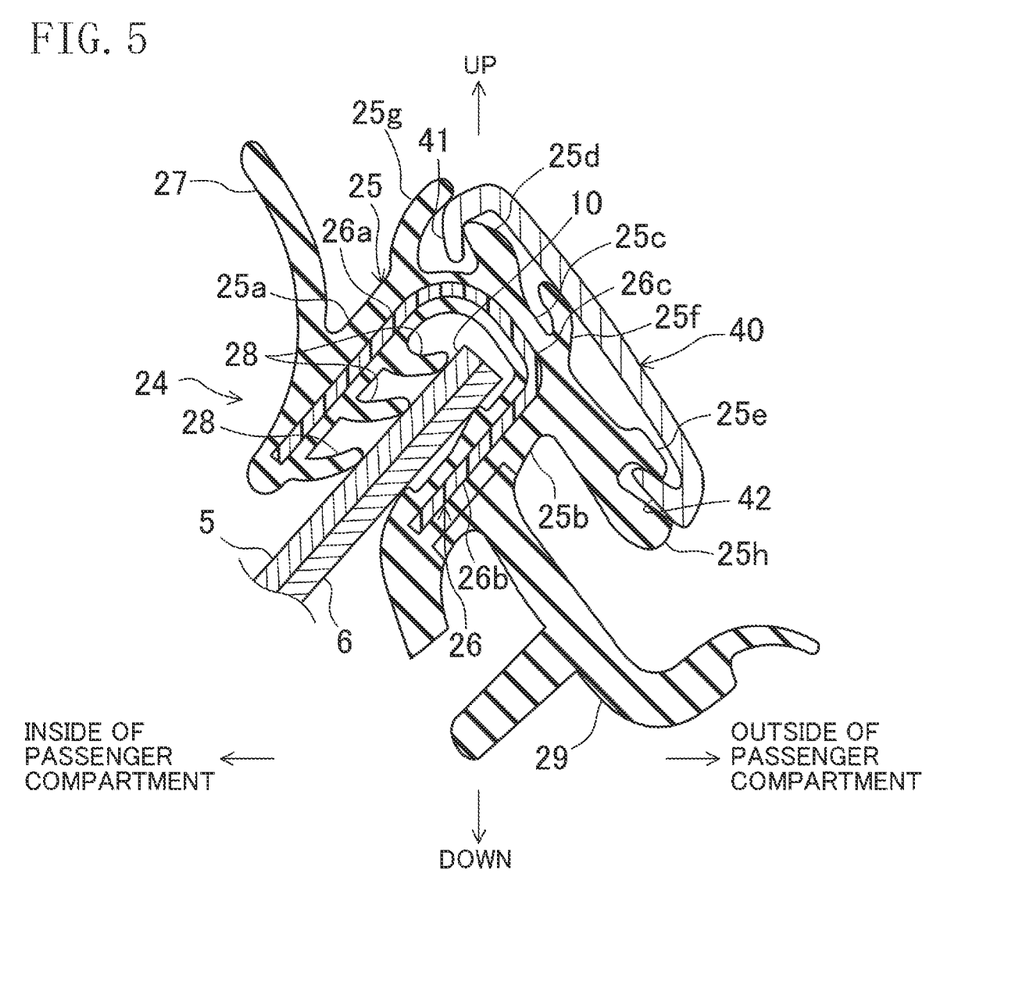
FIG. 5 is a cross-sectional view taken along line V-V in FIG. 3.
Figure 6:
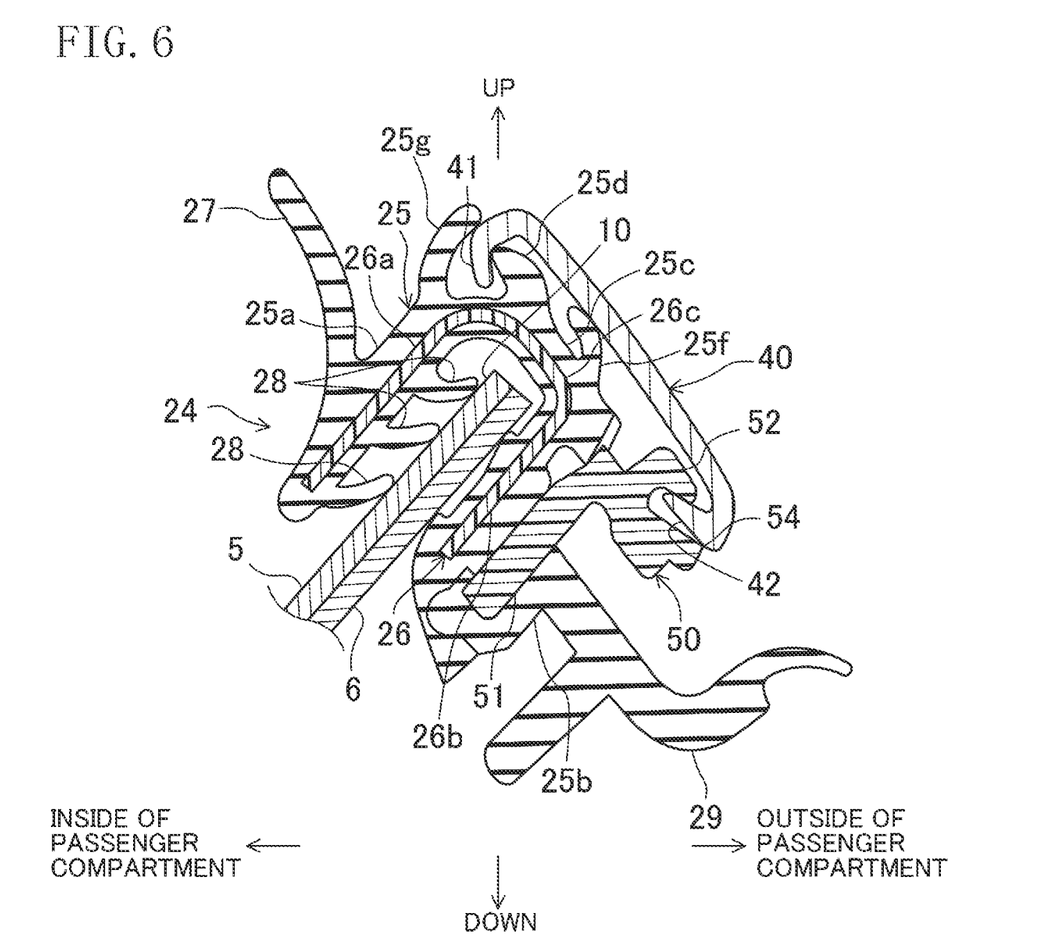
FIG. 6 is a cross-sectional view taken along the line VI-VI in FIG. 3.

The window frame 3 functions as a sash for holding the peripheral edge of the window glass 4 and extends to define a window opening 7. The window opening 7 defined by the window frame 3 is covered or uncovered by the window glass 4. As shown in FIGS. 5 and 6, the window frame 3 according to this embodiment is a combination of a first panel member 5 and a second panel member 6 which are obtained by press-molding a steel plate or the like.

As shown in FIG. 1, the window frame 3 includes a front frame (front-side frame) 3a, a rear frame (rear-side frame) 3b, and an upper frame 3c. The front frame 3a protrudes upward from a front portion of an upper edge of the door body 2 and extends along a front edge of the window glass 4. The rear frame 3b protrudes upward from a rear portion of the upper edge of the door body 2 and extends along a rear edge of the window glass 4. The rear frame 3b extends to be taller than the front frame 3a. The upper frame 3c extends longitudinally from an upper end of the front frame 3a to an upper end of the rear frame 3b along a side edge of a roof (not shown) of the vehicle body. The upper frame 3c is curved in general, but the shape is not limited to the illustrated one and may be curved upward as a whole. The position of the curved portion and the inclination angle of the upper frame 3c may be freely determined in accordance with the shape of the roof of the vehicle body. The front frame 3a of the window frame 3 extends continuously to the front portion of the door body 2. The front portion of the front frame 3a is positioned above the front portion of the door body 2.

As shown in FIGS. 5 and 6, the window frame 3 includes a glass run attachment plate 10 extending toward the outside of the passenger compartment. FIGS. 5 and 6 are cross-sectional views taken along the lines V-V and VI-VI of FIG. 3, respectively. The glass run attachment plate 10 is not present there in the original state, but for convenience of explanation, the glass run attachment plate 10 is shown in FIGS. 5 and 6.

The first panel member 5 and the second panel member 6 constituting the window frame 3 may also be referred to as an inner panel and an outer panel, respectively. A portion of the first panel member 5 positioned above the window opening 7 extends toward the outside of the passenger compartment. A portion of the second panel member 6 positioned above the window opening 7 also extends toward the outside of the passenger compartment. The first panel member 5 and the second panel member 6 are stacked vertically and joined together to form the glass run attachment plate 10 that extends continuously in the front-rear direction.

(Configuration of Glass Run)

The glass run 20 is assembled to the window frame 3 from the outside of the passenger compartment and functions as a sealing member for sealing the gap between the window frame 3 and the window glass 4.

Figure 2:
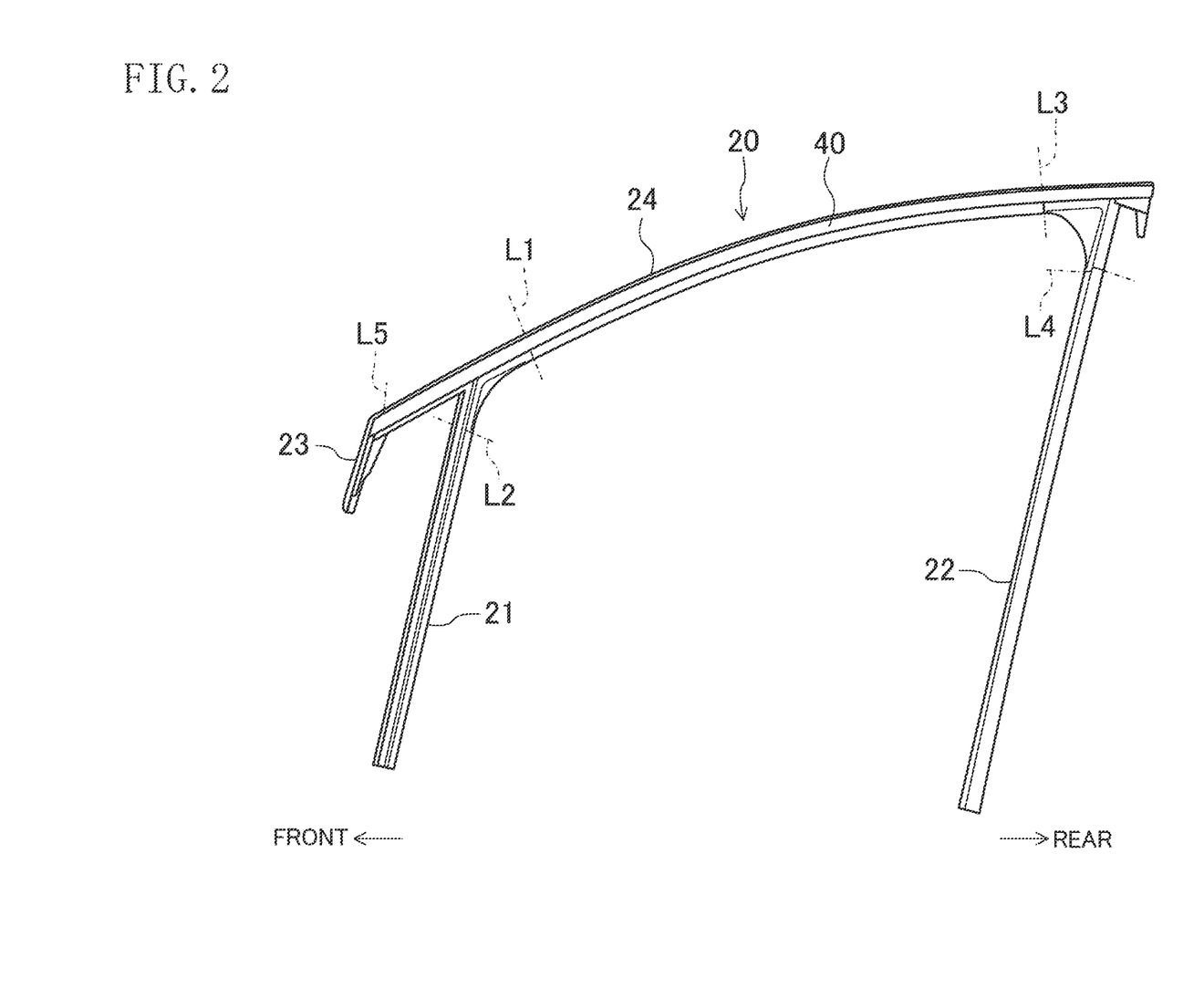
FIG. 2 is a diagram illustrating the automotive door glass run, as viewed from the outside of the passenger compartment.

As shown in FIG. 2, the glass run 20 includes a front glass run 21, a rear glass run 22, a front sealing portion 23, and an upper glass run 24. These components 21 to 24 are integrated into one component. As will be described in detail later, a trim strip 40 is attached to a side of the upper glass run 24 facing the outside of the passenger compartment. Further, the upper glass run 24 is provided with a trim strip holding member 50 such as that shown in FIG. 4 in order to prevent the trim strip 40 from separating and reduce its displacement. The trim strip 40 and the trim strip holding member 50 are members constituting a part of the glass run 20.

The front glass run 21 extends vertically along the front frame 3a of the window frame 3. The rear glass run 22 extends vertically along the rear frame 3b of the window frame 3. The front sealing portion 23 is disposed so as to be separated from and closer to the front than the front frame 3a and is attached to the front portion of the door 1. The front sealing portion 23 may be referred to as an edge sealing portion, for example. An upper end of the front sealing portion 23 is positioned at a front-side upper end of the front frame 3a. The front sealing portion 23 extends downward from the front-side upper end of the front frame 3a along the front portion of the front frame 3a, and further extends downward along the front portion of the door body 2. The front sealing portion 23 is shorter than the front glass run 21, and a lower end of the front sealing portion 23 is positioned higher than a lower end of the front glass run 21.

The upper glass run 24 extends in the front-rear direction from the upper end of the front sealing portion 23, through an upper end of the front glass run 21, to reach an upper end of the rear glass run 22. The front sealing portion 23, the front glass run 21, and the rear glass run 22 are spaced apart from each other at predetermined intervals in the front-rear direction and are integrated by the upper glass run 24 in this state. The upper glass run 24, since extending along the upper frame 3c of the window frame 3, curves gently to be positioned higher toward the rear. The rear side of the upper glass run 24 protrudes further rearward than the rear glass run 22. However, this protruding shape may be provided as necessary.

The glass run 20 is comprised of a combination of an extrusion-molded portion and a die-molded portion that is formed using a die. As shown in FIG. 2, a portion in the vicinity of the boundary between the upper glass run 24 and the front glass run 21 of the glass run 20, i.e., a portion sectioned by boundary lines L1, L2, and L5 (indicated by dash-dot lines), is a die-molded portion. Further, a portion in the vicinity of the boundary between the upper glass run 24 and the rear glass run 22 of the glass run 20, i.e., a portion between boundary lines L3 and L4 (indicated by dash-dot lines) is a die-molded portion. Other portions of the glass run are extrusion-molded.

As shown in FIG. 5, the upper glass run 24 includes a body 25 made of a rubber-like elastic material such as an elastomer, and a core 26 made of a rigid material harder than the material of the body 25. The body 25 is a portion not including the later-described core 26. The body 25 may be made from a rubber such as ethylene-propylene rubber (EPDM) or thermoplastic elastomer (TPE) such as a thermoplastic olefin (TPO) and thermoplastic styrene (TPS). The rubber and TPE may be a sponge material or solid material, and is easily elastically deformed.

The body 25 includes an upper wall 25a, a lower wall 25b, and an outer wall 25c. The upper wall 25a extends along an upper surface of the glass run attachment plate 10. The lower wall 25b extends along a lower surface of the glass run attachment plate 10. The outer wall 25c extends downward from the side of the upper wall 25a closer to the outside of the passenger compartment and is continuous with the side of the lower wall 25b closer to the outside of the passenger compartment. The outer wall 25c is formed so as to protrude further downward than the lower wall 25b.

An upper sealing lip 27 integrally molded with the upper wall 25a is provided on the upper surface of the upper wall 25a. The upper sealing lip 27 protrudes upward from the upper surface of the upper wall 25a. When the automotive door 1 is closed, the upper sealing lip 27 comes into contact with a panel (not shown) of the vehicle body and elastically deforms to seal the gap between the automotive door 1 and the panel of the vehicle body. A plurality of protruding pieces 28 protruding downward are formed on a lower surface of the upper wall 25a. Coming into contact with the upper surface of the glass run attachment plate 10, the protruding pieces 28 are elastically deformed.

A lower planar portion 29 is die-molded on a lower surface of the lower wall 25b. Coming into contact with surfaces of exterior components (not shown) facing inside of the passenger compartment, the lower planar portion 29 elastically deforms.

The body 25 is provided with an attachment unit for attaching the trim strip 40. Specifically, an upper-side upper engagement portion 25d and a lower-side upper engagement portion 25e are provided at upper and lower portions of the outer wall 25c constituting the portion of the body 25 facing the outside of the passenger compartment, respectively. The upper-side upper engagement portion 25d and the lower-side upper engagement portion 25e constitute the attachment unit. The upper-side upper engagement portion 25d is configured as an elongated protrusion that protrudes from the upper portion of the outer wall 25c toward the outside of the passenger compartment and then bends upward. The lower-side upper engagement portion 25e is configured as an elongated protrusion that protrudes from the lower portion of the outer wall 25c toward the outside of the passenger compartment and then bends downward. In addition, an intermediate protrusion 25f is formed at a vertically intermediate portion of the outer wall 25c and protrudes toward the outside of the passenger compartment. The upper-side upper engagement portion 25d, the lower-side upper engagement portion 25e, and the intermediate protrusion 25f each have the same shape continuously along the front-rear direction of the vehicle.

An upper protrusion 25g that protrudes toward the outside of the passenger compartment and extends in the front-rear direction is formed at a portion of the upper wall 25a closer to the outside of the passenger compartment. Further, a lower protrusion 25h that protrudes downward and extends in the front-rear direction is formed at a lower portion of the outer wall 25c.

(Configuration of Core 26)

The core 26 is embedded in the body 25. The core 26 may be made from a rigid material such as a hard resin (e.g., a resin containing talc or glass fibers), an aluminum alloy, a steel material, or stainless steel. The material is harder and has a higher rigidity than that of the body 25. The core 26 has an upper planar portion 26a embedded in the upper wall 25a of the body 25, a lower planar portion 26b embedded in the lower wall 25b, and a side planar portion 26c embedded in the outer wall 25c. The upper planar portion 26a, the lower planar portion 26b, and the side planar portion 26c are integral with each other.

Being an extrusion-molded portion, the upper glass run 24 of the glass run 20, after molding, has a linear shape. On the other hand, since the upper frame 3c of the window frame 3 curves as described above, when the upper glass run 24 is attached to the upper frame 3c of the window frame 3, the upper glass run 24 needs to be curved into the shape that matches the upper frame 3c. Since not the entire body 25 but only the core 26 is a rigid member, the rigidity of the upper glass run 24 is not unnecessarily high but has a proper rigidity. With this proper rigidity, the force required to curve the upper glass run 24 is small.

(Configuration of Trim Strip 40)

The trim strip 40 is a member constituting a design portion of the vehicle, and can also be referred to as a decorative member, for example. The trim strip 40 may be comprised of, for example, a plate material made of metal such as aluminum or stainless steel, a plate material made of hard resin, or the like. Alternatively, the trim strip 40 may have a sheet material or a film material attached to a surface facing the outside of the passenger compartment, or have a surface coated. The trim strip 40 may be a press-molded product or an extrusion-molded product.

As shown in FIG. 1, the trim strip 40 has an elongated shape extending in the front-rear direction along the surface of the upper glass run 24 facing the outside of the passenger compartment. The front end of the trim strip 40 is positioned in the vicinity of the front end of the upper glass run 24, and the rear end of the trim strip 40 is positioned in the vicinity of the rear end of the upper glass run 24. The trim strip 40 is curved along the upper frame 3c.

As shown in FIG. 5, an upper bent portion 41 is provided at an upper portion of the trim strip 40 so as to bend toward the inside of the passenger compartment and then downward. Further, a lower bent portion 42 is provided at a lower portion of the trim strip 40 so as to bend toward the inside of the passenger compartment and then upward. The upper bent portion 41 of the trim strip 40 is inserted between the upper-side upper engagement portion 25d and the upper protrusion 25g of the upper glass run 24. Thus, the upper bent portion 41 is engaged with the upper-side upper engagement portion 25d so as to be hooked from above and from the inside of the passenger compartment. Further, the lower bent portion 42 of the trim strip 40 is inserted between the lower-side upper engagement portion 25e and the lower protrusion 25h of the upper glass run 24. Thus, the lower bent portion 42 is engaged with the lower-side upper engagement portion 25e so as to be hooked from below and from the inside of the passenger compartment. The trim strip 40 is attachable to the upper glass run 24 in this manner.

The trim strip 40 may be attached to the upper glass run 24 in the following manner, for example: the lower bent portion 42 is hooked on the lower-side upper engagement portion 25e, and then the trim strip 40 is rotated upward around the vicinity of the lower-side upper engagement portion 25e to cause the upper bent portion 41 to be hooked on the upper-side upper engagement portion 25d; or the upper bent portion 41 is hooked on the upper-side upper engagement portion 25d, and then the lower bent portion 42 is hooked on the lower-side upper engagement portion 25e.

Pressing the upper bent portion 41 of the trim strip 40 against the upper-side upper engagement portion 25d from the outside of the passenger compartment elastically deforms respective portions, allowing the upper bent portion 41 to be engaged with the upper-side upper engagement portion 25d. Further, pressing the lower bent portion 42 of the trim strip 40 against the lower-side upper engagement portion 25e from the outside of the passenger compartment elastically deforms respective portions, allowing the lower bent portion 42 to be engaged with the lower-side upper engagement portion 25e.

When the trim strip 40 is attached to the upper glass run 24, the upper protrusion 25g of the upper glass run 24 makes contact with the upper portion of the trim strip 40 and elastically deforms. Thus, a gap is less likely to be formed between the upper protrusion 25g and the upper portion of the trim strip 40. Further, the lower protrusion 25h makes contact with the lower portion of the trim strip 40 and elastically deforms. In addition, the intermediate protrusion 25f of the upper glass run 24 makes contact with the surface of the trim strip 40 facing the inside of the passenger compartment and elastically deforms. Thus, the wobbling of the trim strip 40 is reduced.

Figure 3:
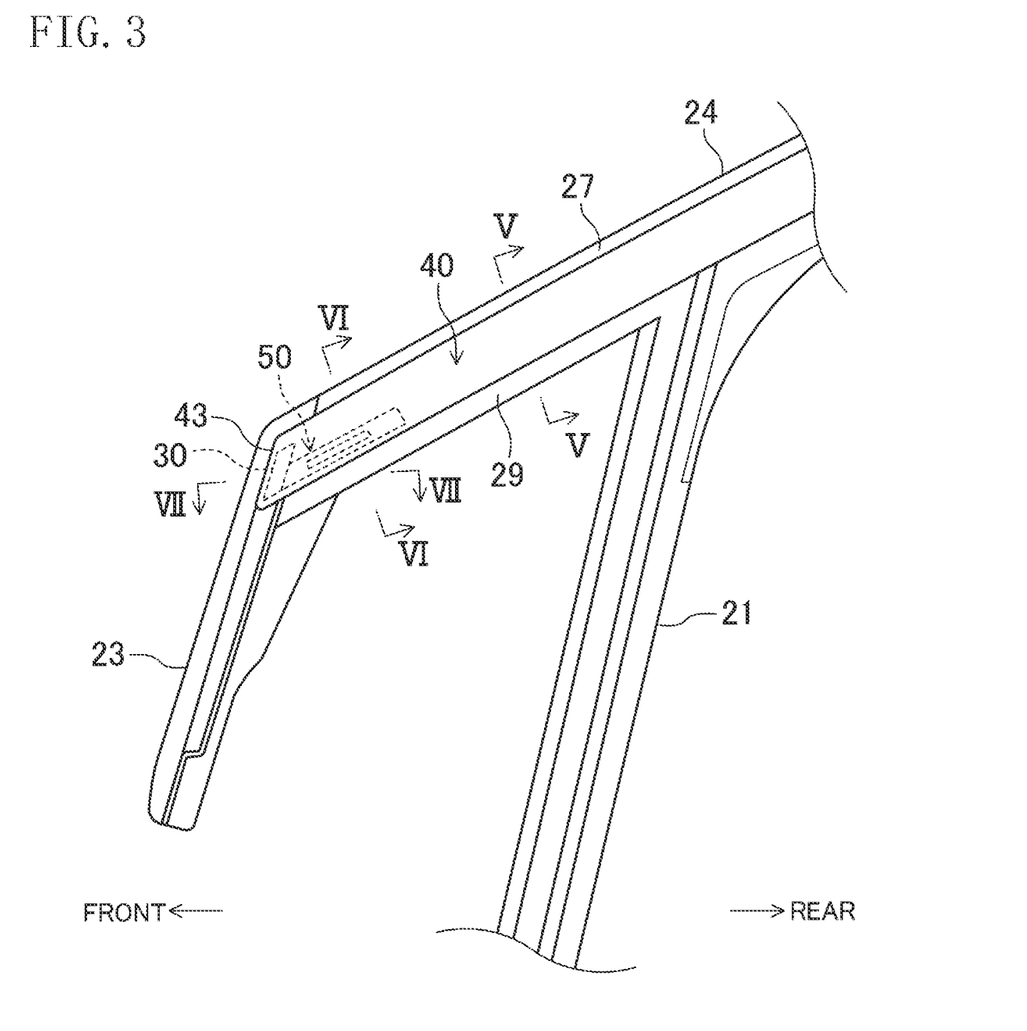
FIG. 3 is an enlarged diagram of a portion of the automotive door glass run closer to the front side of the vehicle.
Figure 7:
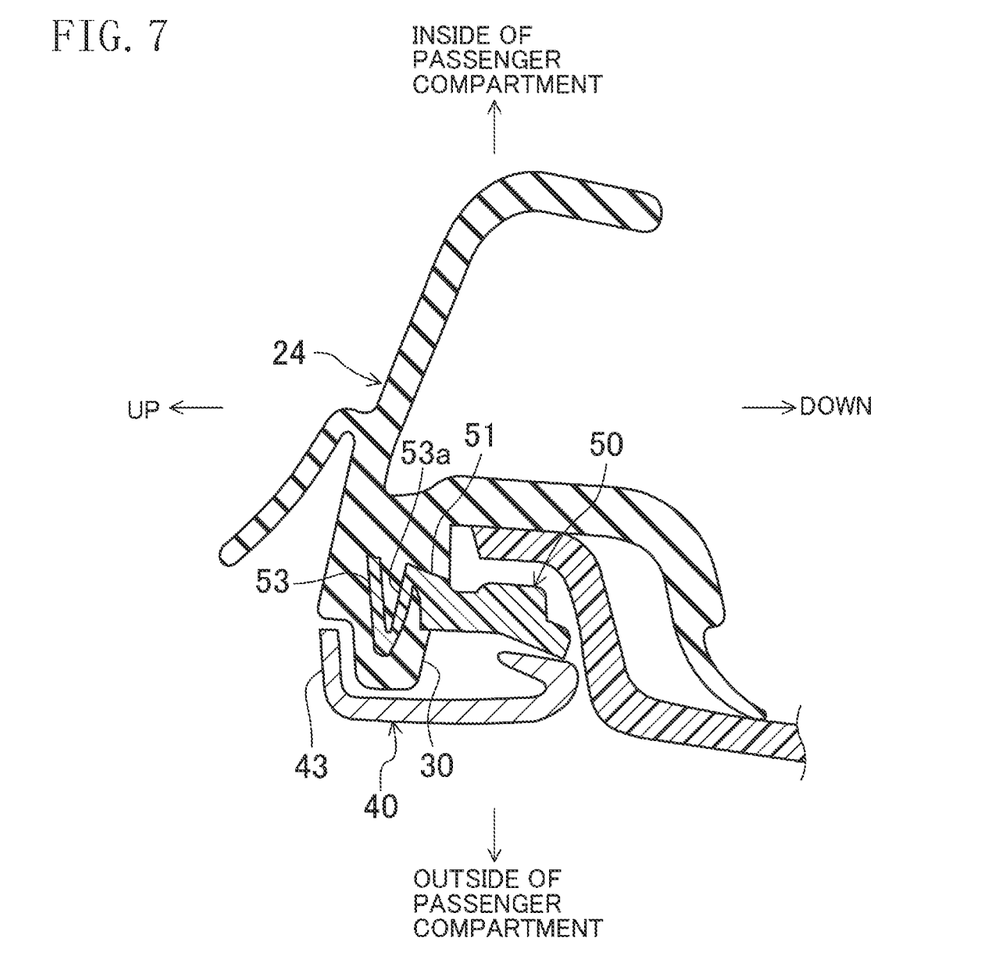
FIG. 7 is a cross-sectional view taken along the line VII-VII in FIG. 3.

As shown in FIGS. 3 and 7, a front planar portion (front contact portion) 43 bent toward the inside of the passenger compartment is provided at a front portion of the trim strip 40. The front planar portion 43 extends in the vertical direction.

(Configuration of Trim Strip Holding Member 50)

Figure 4:
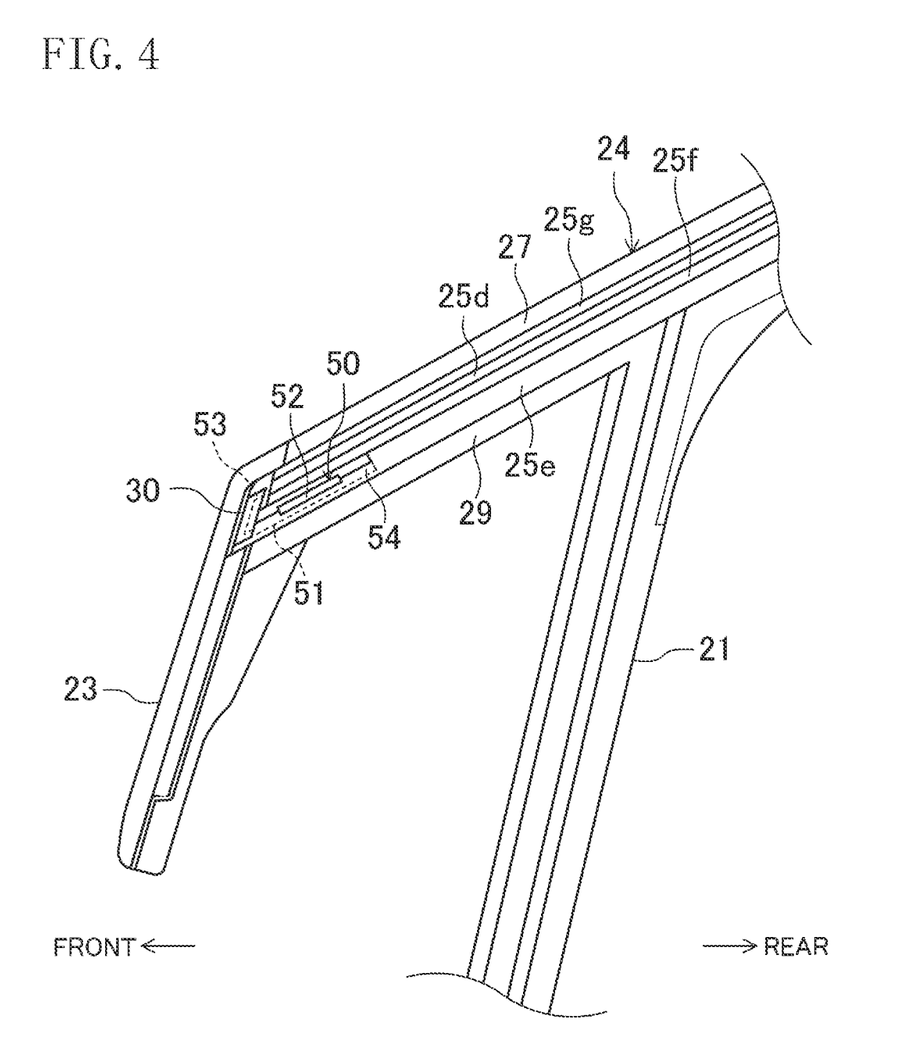
FIG. 4 is a diagram corresponding to FIG. 3 and illustrates a state in which a trim strip is removed.

As shown in FIGS. 3 and 4, the trim strip holding member 50 is fixed to the upper glass run 24 at a position closer to the front than the front glass run 21. The trim strip holding member 50 is capable of reducing the possibility of the front side of the trim strip 40 becoming separated from the upper glass run 24, and the possibility of the trim strip 40 being displaced rearward.

That is, the glass run 20 according to this embodiment includes the front sealing portion 23, and the front sealing portion 23 may be bent greatly during transportation of the glass run 20 having the trim strip 40. Further, in assembling the glass run 20 having the trim strip 40 to the window frame 3, the front sealing portion 23 may sometimes be bent from the vicinity of its base so as to be elastically deformed and be disposed along the front edge of the door 1. When the front sealing portion 23 is largely bent, the bending force reaches also the upper glass run 24 and causes the upper glass run 24 to elastically deform. As a result, the upper-side upper engagement portion 25d and the lower-side upper engagement portion 25e of the upper glass run 24 become separated from the trim strip 40, which may cause defects such as deterioration of the exterior appearance.

In addition, when the door 1 is opened and closed many times or closed strongly, the trim strip 40 may be displaced toward the rear of the vehicle since the trim strip 40 is a member independent of the upper glass run 24. When displaced rearward, the trim strip 40 may interfere with other components provided on the rear side of the door 1, which may cause the deterioration of the exterior appearance.

In order to solve these problems, the trim strip holding member 50 is provided. The trim strip holding member 50 is a member made of a rigid material that is harder than a portion of the upper glass run 24 (made of a rubber-like elastic material) at which the upper glass run 24 comes into contact with the window glass 4 or an exterior component. Such a member may be made of, for example, a material similar to that of the core 26. However, the material is not limited thereto.

Figure 8:
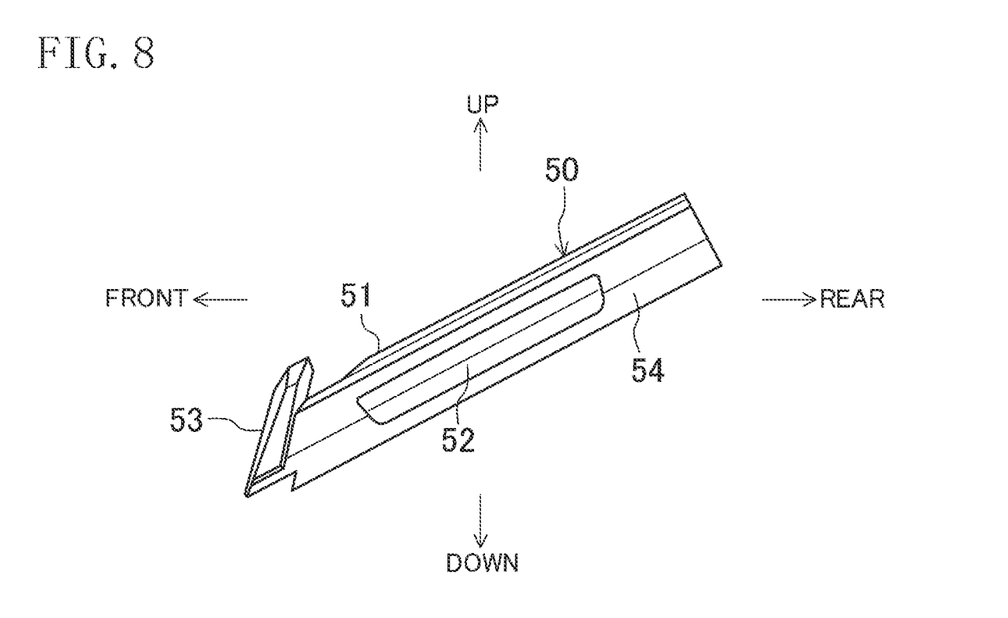
FIG. 8 is a diagram illustrating a trim strip holding member, as viewed from the outside of the passenger compartment.

As shown in FIG. 8, the trim strip holding member 50 has an elongated shape extending in the front-rear direction. As shown in FIG. 4, the trim strip holding member 50 is disposed so as to be inclined in the same manner as the front portion of the upper glass run 24, and thus the more rearward it extends, the higher positioned it is. The trim strip holding member 50 includes an embedded planar portion 51 embedded in the upper glass run 24, a front engagement portion 52, and a positioning portion 53.

As shown in FIG. 6, the embedded planar portion 51 is disposed below the lower planar portion 26b of the core 26, extends along the core 26 in the front-rear direction, and extends also in the inward-outward direction of the vehicle. The dimension of the embedded planar portion 51 in the front-rear direction is set to be longer than the dimension of the embedded planar portion 51 in the inward-outward direction of the vehicle. The rubber-like elastic material constituting the lower planar portion 29 is interposed between the lower planar portion 26b of the core 26 and the distal end of the embedded planar portion 51. The rubber-like elastic material is fixed to the upper surface of the embedded planar portion 51. Further, the rubber-like elastic material constituting the lower planar portion 29 is also fixed to the lower surface of the embedded planar portion 51. Therefore, the embedded planar portion 51 is embedded in and fixed to the lower planar portion 29.

The front engagement portion 52 is formed integrally with the embedded planar portion 51 and is configured as an elongated protrusion that protrudes from a portion of the embedded planar portion 51 closer to the outside of the passenger compartment toward the outside of the passenger compartment, bends downward, and extends in the front-rear direction. The front engagement portion 52 may be continuous or may be noncontinuous in the front-rear direction. The front engagement portion 52 is disposed ahead of the lower-side upper engagement portion 25e on an extension line extending to the front side of the lower-side upper engagement portion 25e. That is, the lower-side upper engagement portion 25e does not reach the front portion of the upper glass run 24, and ends before reaching the front engagement portion 52. The front engagement portion 52 extends forward in a continuous manner from the front portion of the lower-side upper engagement portion 25e. The lower-side upper engagement portion 25e and the front engagement portion 52 may be continuous without a gap therebetween, or there may be a gap between the lower-side upper engagement portion 25e and the front engagement portion 52.

The front engagement portion 52 protrudes further to the outside of the passenger compartment than the surface of the upper glass run 24 facing the outside of the passenger compartment, and is engaged with the lower bent portion 42 of the trim strip 40 so as to be hooked from below and from the inside of the passenger compartment. Since the front engagement portion 52 is made of a rigid material, once the front engagement portion 52 is engaged with the lower bent portion 42 of the trim strip 40, the lower bent portion 42 is less likely to be detached from the upper glass run 24. The front engagement portion 52 and the lower-side upper engagement portion 25e may be engaged with the lower bent portion 42 simultaneously with the attachment of the trim strip 40.

A lower protrusion 54 protruding downward and extending in the front-rear direction is formed at a lower portion of the front engagement portion 52 of the trim strip holding member 50. The lower bent portion 42 of the trim strip 40 is inserted between the front engagement portion 52 and the lower protrusion 54. The lower protrusion 54 is positioned on an extension line of the lower protrusion 25h of the upper glass run 24 extending toward the front.

As shown in FIG. 7, a protrusion 30 protruding toward the outside of the passenger compartment is provided at a position of the upper glass run 24 closer to the front than the front glass run 21. As shown in FIG. 4, the protrusion 30 is positioned directly above the upper end of the front sealing portion 23. This protrusion 30 has a vertically elongated shape and, as shown in FIG. 3, is disposed so as to be covered by the front portion of the trim strip 40 from the outside of the passenger compartment, with the trim strip 40 attached to the upper glass run 24.

The front planar portion 43 of the trim strip 40 is disposed at a position closer to the front than the protrusion 30 of the upper glass run 24. The front planar portion 43 and the protrusion 30 overlap each other as viewed in the front-rear direction. Thus, the front planar portion 43 and the protrusion 30 are in a positional relationship in which the front planar portion 43 can abut on the protrusion 30 from the front. When the trim strip 40 is at a normal position (a center position of a range of tolerance), the front planar portion 43 may be separated frontward from the protrusion 30. In this case, the front planar portion 43 and the protrusion 30 are in the positional relationship in which the front planar portion 43 and the front surface of the protrusion 30 face each other with a gap therebetween. The front planar portion 43 may be in contact with the front surface of the protrusion 30.

The positioning portion 53 of the trim strip holding member 50 is embedded in the protrusion 30. The positioning portion 53 protrudes toward the outside of the passenger compartment and, as shown in FIG. 8, has a vertically elongated shape so as to correspond to the shape of the protrusion 30.

As shown in FIG. 7, the positioning portion 53 includes a filled portion 53a that is filled with the rubber-like elastic material of the die-molded portion from the side of the positioning portion 53 closer to the inside of the passenger compartment. The filled portion 53a has a shape that is open toward the inside of the passenger compartment before the positioning portion 53 is embedded. In embedding the positioning portion 53, the rubber-like elastic material flows in and fills the filled portion 53a. Thus, the positioning portion 53 is firmly fixed to the upper glass run 24.

When the trim strip 40 is caused to displace rearward, the front planar portion 43 abuts on the protrusion 30 from the front side. At this time, since the positioning portion 53 made of a rigid material is embedded in the protrusion 30 and integrated with the embedded planar portion 51, the protrusion 30 is less likely to be deformed and displaced rearward. As a result, rearward displacement of the trim strip 40 is reduced.

The trim strip holding member 50 may be insert-molded into the upper glass run 24. That is, an open/close molding die (not shown) is used to form the die-molded portion of the upper glass run 24. The trim strip holding member 50 is held and clamped by this molding die. Then, the material is injected into the cavity, thereby achieving integral molding with a part of the trim strip holding member 50 is embedded in the die-molded portion.

The method is not limited to insert-molding, and, for example, a two-color molding method, a die-slide injection, or the like may be used. In this case, after the trim strip holding member 50 is formed in the die using a resin material, the molding die is replaced, and the trim strip holding member 50 is held in a new cavity, into which a rubber-like elastic material is injected to form the upper glass run 24. The trim strip holding member 50 and the upper glass run 24 can be integrally molded in this manner.

Alternatively, the trim strip holding member 50 and the upper glass run 24 may be molded independently of each other, and then the trim strip holding member 50 may be fixed to the upper glass run 24.

Advantages of Embodiment

As described above, according to this embodiment, the trim strip holding member 50 made of a rigid material is fixed to a portion of the upper glass run 24 closer to the front of the vehicle, and the trim strip holding member 50 includes the front engagement portion 52 that protrudes toward the outside of the passenger compartment and engages with the trim strip 40. Thus, even if a bending force is applied to the front sealing portion 23 attached to the front portion of the door 1, the trim strip 40 is kept from detaching from the upper glass run 24, which enables to reduce the occurrence of defects.

Further, when the trim strip 40 is caused to displace rearward due to opening and closing of the door 1, and the front planar portion 43 of the trim strip 40 comes into contact with the protrusion 30 of the upper glass run 24, the rearward displacement of the trim strip 40 is sufficiently reduced by the protrusion 30 and the positioning portion 53 of the trim strip holding member 50. As a result, the trim strip 40 does not interfere with other components (e.g., components of the rear door), and a good exterior appearance can be maintained.

The embodiment described above is a mere example in all respects and shall not be interpreted in a limited manner. All modifications and variations coming within the equivalency range of the appended claims are embraced within the scope of the present disclosure.

As can be seen from the foregoing description, the automotive door glass run according to the present disclosure may be attached to a window frame from the outside of the passenger compartment.

What is claimed is:

1. An automotive door glass run configured to be attached, from outside of a passenger compartment of a vehicle, to a glass run attachment plate which is included in an upper frame of a window frame and which extends toward the outside of the passenger compartment, to seal a gap between the window frame and a window glass, the window frame extending so as to define a window opening of an automotive door, the automotive door glass run comprising:

a front glass run extending vertically along a front-side frame of the window frame;

a rear glass run extending vertically along a rear-side frame of the window frame;

a front sealing portion disposed so as to be separated from and closer to a front of the vehicle than the front glass run, the front sealing portion being configured to be attached to a vehicle front portion of the door;

an upper glass run extending from an upper end of the front sealing portion, through an upper end of the front glass run, to reach an upper end of the rear glass run, the upper glass run including an upper-side upper engagement portion and a lower-side upper engagement portion at upper and lower portions of a side of the upper glass run facing the outside of the passenger compartment, respectively;

a trim strip extending in a vehicle front-rear direction along the side of the upper glass run facing the outside of the passenger compartment, the trim strip being configured to be attached to the upper glass run by being engaged with the upper-side upper engagement portion and the lower-side upper engagement portion; and a trim strip holding member made of a rigid material harder than a portion of the upper glass run at which the upper glass run comes into contact with the window glass, the trim strip holding member being fixed to the upper glass run at a position closer to a front side of the vehicle than the front glass run, the trim strip holding member having a front engagement portion protruding further to the outside of the passenger compartment than a surface of the upper glass run facing the outside of the passenger compartment and configured to engage with the trim strip.

2. The automotive door glass run of claim 1, wherein the trim strip holding member includes an embedded planar portion embedded in the upper glass run.

3. The automotive door glass run of claim 2, wherein the upper glass run includes a core made of a rigid material harder than the portion at which the upper glass run comes into contact with the window glass, and the embedded planar portion is disposed below the core and extends along the core in the vehicle front-rear direction.

4. The automotive door glass run of claim 1, wherein each of the upper-side upper engagement portion and the lower-side upper engagement portion is configured as an elongated protrusion that protrudes from the surface of the upper glass run facing the outside of the passenger compartment toward the outside of the passenger compartment and extending in the vehicle front-rear direction, and the front engagement portion of the trim strip holding member is disposed closer to the front of the vehicle than the lower-side upper engagement portion and positioned on an extension line of the lower-side upper engagement portion extending toward the front side of the vehicle.

5. The automotive door glass run of claim 1, wherein the upper glass run includes a protrusion protruding toward the outside of the passenger compartment at a position closer to the front side of the vehicle than the front glass run, the trim strip includes a front contact portion at a position closer to the front side of the vehicle, the front contact portion being positioned so as to be capable of abutting on the protrusion from the front side of the vehicle, and the trim strip holding member includes a positioning portion embedded in the protrusion.

6. The automotive door glass run of claim 5, wherein the positioning portion of the trim strip holding member protrudes toward the outside of the passenger compartment.

7. The automotive door glass run of claim 6, wherein the positioning portion of the trim strip holding member includes a filled portion that is filled with a material forming the upper glass run from a side of the positioning portion closer to the passenger compartment.

* * * * *